(12) United States Patent
Yang et al.

(10) Patent No.: US 10,657,244 B2
(45) Date of Patent: May 19, 2020

(54) IDENTITY AUTHENTICATION METHOD AND APPARATUS

(71) Applicant: Tencent Technology (Shenzhen) Company Limited, Shenzhen (CN)

(72) Inventors: Xia Yang, Shenzhen (CN); Luyi Lin, Shenzhen (CN); Yunyun Hao, Shenzhen (CN); Yifeng Li, Shenzhen (CN); Shaoyu Zhang, Shenzhen (CN); Liang Wang, Shenzhen (CN); Jiwei Guo, Shenzhen (CN)

(73) Assignee: Tencent Technology (Shenzhen) Company Limited, Shenzhen, Guangdong Province (CN)

(*) Notice: Subject to any disclaimer, the term of this patent is extended or adjusted under 35 U.S.C. 154(b) by 278 days.

(21) Appl. No.: 15/817,014

(22) Filed: Nov. 17, 2017

(65) Prior Publication Data
US 2018/0075230 A1    Mar. 15, 2018

Related U.S. Application Data

(63) Continuation-in-part of application No. PCT/CN2016/083105, filed on May 24, 2016, and a
(Continued)

(30) Foreign Application Priority Data

| Oct. 26, 2015 | (CN) | .......................... 2015 1 0703477 |
| Oct. 26, 2015 | (CN) | .......................... 2015 1 0703867 |
| Nov. 17, 2015 | (CN) | .......................... 2015 1 0797063 |

(51) Int. Cl.
*G06F 21/36* (2013.01)
*G06F 21/31* (2013.01)

(52) U.S. Cl.
CPC ............ *G06F 21/36* (2013.01); *G06F 21/316* (2013.01); *G06F 2221/2133* (2013.01); *G06F 2221/2141* (2013.01)

(58) Field of Classification Search
CPC ........ G06F 21/316; G06F 21/34; G06F 21/36; G06F 2221/2133; G06F 2221/2141;
(Continued)

(56) References Cited

U.S. PATENT DOCUMENTS

| 9,147,058 B2 | 9/2015 | Casey et al. |
| 2013/0314336 A1 | 11/2013 | Ting |
| 2015/0278492 A1* | 10/2015 | Tungare .................. G06F 21/31 726/19 |

FOREIGN PATENT DOCUMENTS

| CN | 101848276 A | 9/2010 |
| CN | 102203794 A | 9/2011 |

(Continued)

OTHER PUBLICATIONS

Computer-Generated Translation of Chinese Application Publication CN 102455842A retrieved from Espacenet on Oct. 21, 2019.*
(Continued)

*Primary Examiner* — Minh Dinh
(74) *Attorney, Agent, or Firm* — Morgan, Lewis & Bockius LLP

(57) ABSTRACT

Embodiments of the present disclosure disclose an identity authentication method performed at a computing device, the method including: obtaining a sequence of finger gestures on a touchpad of the computing device from a user, wherein each finger gesture has an associated pressure type on the touchpad; generating a corresponding character string according to the sequence of finger gestures; comparing the character string with a verification code of a user account associated with an application program; in accordance with a determination that the character string matches the veri-
(Continued)

fication code, granting the user access to the user account associated with the application program; and in accordance with a determination that the character string does not match the verification code, denying the user access to the user account associated with the application program.

15 Claims, 6 Drawing Sheets

Related U.S. Application Data continuation-in-part of application No. PCT/CN2016/083305, filed on May 25, 2016, and a continuation-in-part of application No. PCT/CN2016/102368, filed on Oct. 18, 2016.

(58) Field of Classification Search
CPC ... H04L 63/08; H04L 63/083; H04L 63/0838; H04L 63/0853; H04W 12/06
See application file for complete search history.

(56) References Cited

FOREIGN PATENT DOCUMENTS

| | | | |
|---|---|---|---|
| CN | 102455842 | A | 5/2012 |
| CN | 102982269 | A | 3/2013 |
| CN | 103235903 | A | 8/2013 |
| CN | 103870744 | A | 6/2014 |
| CN | 103942477 | A | 7/2014 |
| CN | 104023029 | A | 9/2014 |
| CN | 104063642 | A | 9/2014 |
| CN | 104281389 | A | 1/2015 |
| CN | 104580117 | A | 4/2015 |
| CN | 104584024 | A | 4/2015 |
| CN | 104598786 | A | 5/2015 |
| CN | 104778397 | A | 7/2015 |
| CN | 105184126 | A | 12/2015 |
| CN | 105468952 | A | 4/2016 |

OTHER PUBLICATIONS

Tencent Technology, ISRWO, PCT/CN2016/083105, Aug. 12, 2016, 8 pgs.
Tencent Technology, IPRP, PCT/CN2016/083105, May 1, 2018, 7 pgs.
Tencent Technology, ISRWO, PCT/CN2016/083305, Aug. 29, 2016, 8 pgs.
Tencent Technology, IPRP, PCT/CN2016/083305, May 22, 2018, 8 pgs.
Tencent Technology, ISRWO, PCT/CN2016/102368, Jan. 20, 2017, 7 pgs.
Tencent Technology, IPRP, PCT/CN2016/102368, May 1, 2018, 6 pgs.

* cited by examiner

IDENTITY AUTHENTICATION METHOD AND APPARATUS

RELATED APPLICATIONS

This application is a continuation-in-part application of (i) PCT/CN2016/083105, entitled "IDENTITY VERIFICATION METHOD AND APPARATUS" filed on May 24, 2016, which claims priority to Chinese Patent Application No. 201510703867.8, filed with the Chinese Patent Office on Oct. 26, 2015, and entitled "IDENTITY AUTHENTICATION METHOD AND APPARATUS", (ii) PCT/CN2016/083305, entitled "METHOD AND DEVICE FOR VERIFYING IDENTITY" filed on May 25, 2016, which claims priority to Chinese Patent Application No. 201510797063.9, filed with the Chinese Patent Office on Nov. 17, 2015 and entitled "IDENTITY AUTHENTICATION METHOD AND APPARATUS", and (iii) PCT/CN2016/102368, entitled "IDENTITY AUTHENTICATION METHOD AND DEVICE" filed on Oct. 18, 2016, which claims priority to Chinese Patent Application No. 201510703477.0, filed with the Chinese Patent Office on Oct. 26, 2015, and entitled "IDENTITY AUTHENTICATION METHOD AND APPARATUS", all of which are incorporated herein by reference in their entirety.

FIELD OF THE TECHNOLOGY

The present disclosure relates to the field of communications technologies, and in particular, to an identity authentication method and apparatus.

BACKGROUND OF THE DISCLOSURE

Nowadays, every aspect of people's lives almost always requires data. For example, online shopping, money transfer, and session are all related to data processing. Therefore, how to ensure data security also becomes a problem that the industry is always intensely concerned about.

In the existing technology, an identity authentication manner is usually used to improve data security. For example, comparison is performed between authentication information performed by a user, such as an account and a password, with prestored authentication information, and if the authentication information is the same as the prestored authentication information, authentication succeeds; otherwise, the authentication fails. To effectively prevent a hacker from making continuous login attempts (that is, authentication attempts) in a particular program brute force cracking manner for a particular registered user. In the existing technology, a "verification code" technology is further provided, that is, a problem that only a human being can answer is randomly generated, such as a digit string, letters, a text, an image, or a problem. A login user is required to enter information according to a requirement of the verification code, and only if the entered information is correct and authentication information is correct, it may be determined that authentication succeeds. In brief, the existence of the verification code is to distinguish whether the authentication information is entered by a person or input by a machine, so as to improve security.

SUMMARY

Embodiments of the present disclosure provide an identity authentication method and apparatus, so that a verification code entered by a user may be obtained by using a touchpad, thereby improving operation flexibility under the premise that data security is ensured.

An embodiment of the present disclosure provides an identity authentication method performed at a computing device having one or more processors, memory storing one or more programs to be executed by the one or more processors and a touchpad, the method comprising:

obtaining a sequence of finger gestures on the touchpad from the user, wherein each finger gesture has an associated pressure type on the touchpad;

generating a corresponding character string according to the sequence of finger gestures;

comparing the character string with a verification code of a user account associated with an application program;

in accordance with a determination that the character string matches the verification code, granting the user access to the user account associated with the application program; and in accordance with a determination that the character string does not match the verification code, denying the user access to the user account associated with the application program.

An embodiment of the present disclosure further provides a computing device comprising one or more processors, a touchpad, memory, and one or more programs stored in the memory that, when executed by the one or more processors, cause the computing device to perform the aforementioned identity authentication method.

An embodiment of the present disclosure further provides a non-transitory computer readable storage medium, storing one or more programs, wherein the one or more programs, when executed by one or more processors of a computing device having a touchpad, cause the computing device to perform the aforementioned identity authentication method.

In the embodiments of the present disclosure, when an identity authentication request of a user is received, a verification code is generated according to the identity authentication request; a finger gesture of the user on a touchpad is obtained when it is determined that the user needs to enter the verification code; a corresponding character string is generated according to the finger gesture; matching is performed between the character string and the verification code according to a preset rule; and if the character string matches the verification code, it is determined that identity authentication succeeds when it is determined that authentication information carried in the identity authentication request is correct; otherwise, if the character string does not match the verification code, the identity authentication request is rejected, thereby achieving an objective of performing identity authentication on the user. According to the embodiments of the present disclosure, during obtaining the verification code entered by the user, the verification code is obtained by monitoring a touchpad instead of by using a keyboard. Therefore, compared with the existing technology that the verification code can be entered by using only the keyboard, the embodiments of the present disclosure provide one more selection for the user to enter the verification code, thereby greatly facilitating operations of the user, so as to beneficial to improve operation flexibility and interesting.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person skilled in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person skilled in the art based on the embodiments of the present disclosure without creative efforts shall fall within the protection scope of the present disclosure.

An embodiment of the present disclosure provides an identity authentication method. In this embodiment, a description is made from a perspective of an identity authentication apparatus, and the identity authentication apparatus may be specifically integrated into a terminal, a server, or another device requires identity authentication.

An identity authentication method is provided, including: receiving an identity authentication request of a user, the identity authentication request carrying authentication information; generating the verification code according to the authentication information; obtaining a finger gesture of the user on a touchpad when determining that the user needs to enter the verification code; generating a corresponding character string according to the sequence of finger gestures; matching the character string with the verification code according to a preset rule; and if the character string matches the verification code, determining that identity authentication succeeds when determining that the authentication information is correct; or if the character string does not match the verification code, rejecting the identity authentication request.

Figure 1:
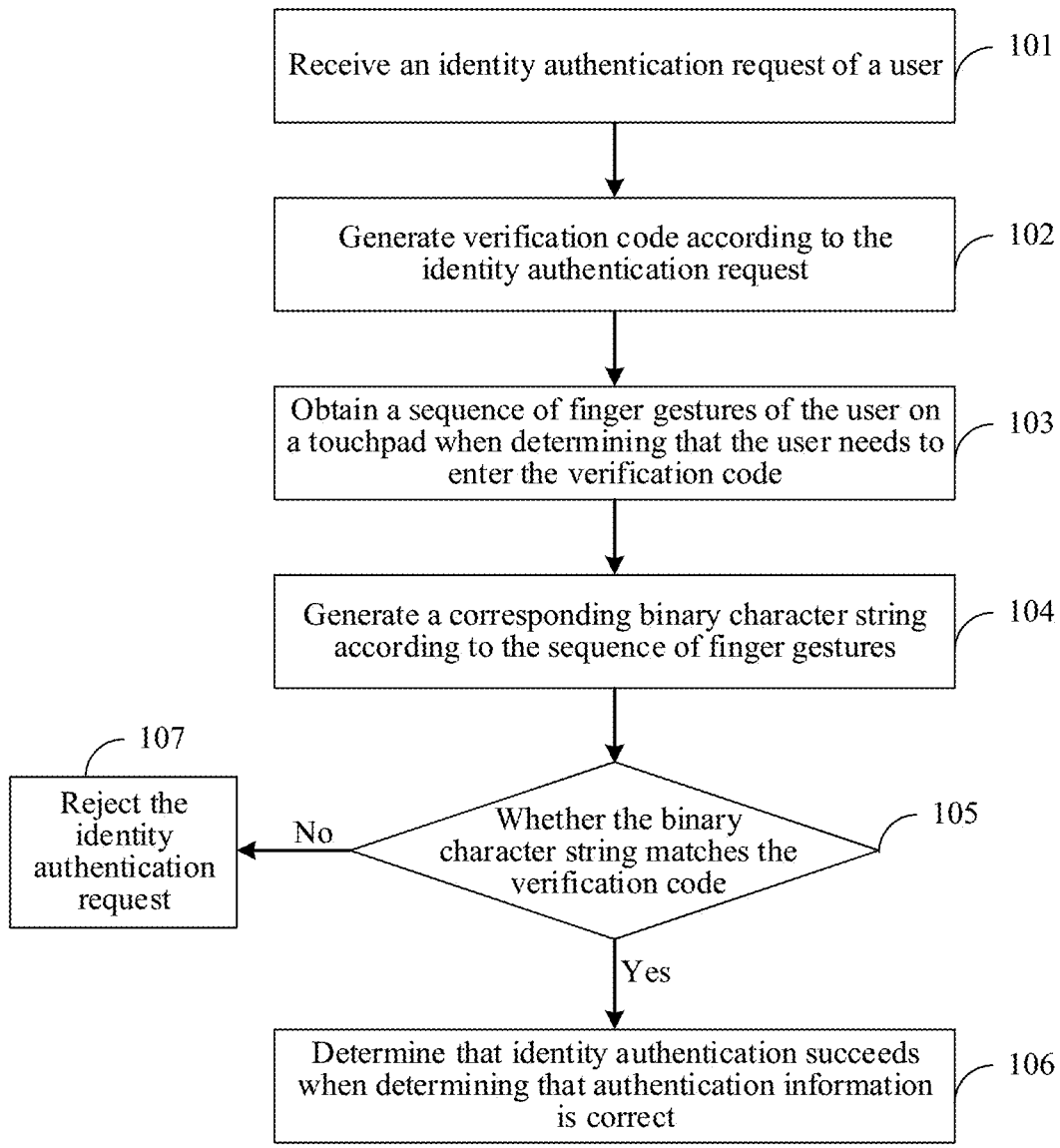
FIG. 1 is a flowchart of an identity authentication method according to some embodiments of the present disclosure.

As shown in FIG. 1, a specific procedure of the identity authentication method may include the following operations:

101: Receive an identity authentication request of a user.

The identity authentication request may carry authentication information, for example, an account and a password of the user. The account may include an email address, a number of instant messaging, a name of the user, or a number of the user.

102: Generate a verification code according to the identity authentication request.

For example, when the identity authentication request of the user is received, for example, when the user opens a login interface, or the user enters the authentication information, or the user clicks a trigger key for generating the verification code on the login interface, the verification code is generated according to a preset policy.

The preset policy may be determined according to a requirement of an actual application. For example, the verification code may be randomly generated, or may be generated according to a rule. the verification code may be a character string, or may be digits in another base, such as decimal or hexadecimal digits; or may even be an image combination or a colour combination, such as a combination of a male photo and a female photo, a combination of black and white, or a combination of blue and red, and details are not described herein.

In this embodiment of the present disclosure, for ease of operations of the user, during verification code generation, prompt information may further be generated, so as to indicate a correspondence between a finger gesture and a binary character.

For example, if "0" indicates a light touch and "1" indicates a tap, the user may be informed that: "0 indicates a light touch and 1 indicates a tap. Please enter gestures in order".

For another example, if "1" indicates a light touch and "0" indicates a tap, the user may be informed that: "1 indicates a light touch and 0 indicates a tap. Please enter gestures in order".

For another example, if a male photo indicates a light touch and a female photo indicates a tap, the user may be informed that: "A male photo indicates a light touch and a female photo indicates a tap. Please enter gestures in order".

For another example, if black indicates a light touch and white indicates a tap, the user may be informed that: "Black indicates a light touch and white indicates a tap. Please enter gestures in order".

For another example, entered information may alternatively be distinguished according to different pressing forces. For example, If "0" indicates a light press and "1" indicates a heavy press, the user may be informed that: "0 indicates a light press and 1 indicates a heavy press. Please enter gestures in order".

Alternatively, if "1" indicates a light press and "0" indicates a heavy press, the user may be informed that: "1 indicates a light press and 0 indicates a heavy press. Please enter gestures in order".

The rest can be deduced by analogy, and details are not described herein again.

It should be noted that, besides a "light touch", a "tap", a "light press", and a "heavy press", there may be another finger gesture, such as "drawing a circle". A correspondence between the finger gesture and a binary character may be set according to a requirement of an actual application, and details are not described herein again.

103: Obtain a sequence of finger gestures of the user on a touchpad when determining that the user needs to enter the verification code.

In some embodiments, each finger gesture has an associated pressure type indicating whether the finger gesture is a light touch or a tap according to the pressure level, a long touch or a short touch according to the duration of the pressure (e.g., the long touch requires that the finger pressure be at least one second and the short touch requires that the finger pressure be no more than 0.5 second and the finger pressure longer than 0.5 second and less than one second is deemed to be invalid).

In some other embodiments, the touchpad is divided into multiple regions, each region being associated with a unique character. For example, the touchpad is divided into 3×3 regions and each region represents one of the decimal characters "1"-"9". For each finger gesture, the computing device determines its associated pressure location in addition to its pressure type such that a unique character associated with the region according to the pressure location of the finger gesture and a binary character according to the pressure type of the finger gesture. For example, a light touch at the top left corner of the touchpad corresponds to a two-character string "10", a tap at the top right corner of the touchpad corresponds to a two-character string "31", a tap at the bottom left corner of the touchpad corresponds to a two-character string "71", a light touch at the bottom right corner of the touchpad corresponds to a two-character string "90", etc.

In yet some other embodiments, a pressure duration of a finger gesture is also takes into account when determine a character string corresponding to a sequence of finger gestures in connection with the pressure location of the finger touch. For example, the touchpad is divided into 3×3 regions and each region represents one of the decimal characters "1"-"9". For each finger gesture, the computing device determines its associated pressure location in addition to its pressure duration such that a unique character associated with the region according to the pressure location of the finger gesture and a binary character according to the pressure type of the finger gesture. For example, a short touch at the top left corner of the touchpad corresponds to a two-character string "10", a short touch at the top right corner of the touchpad corresponds to a two-character string "30", a long touch at the bottom left corner of the touchpad corresponds to a two-character string "71", a long touch at the bottom right corner of the touchpad corresponds to a two-character string "91", etc.

Note that information about the pressure location, pressure type and pressure duration of a finger gesture can be combined in many manners when determining one or more characters for the finger gesture. For example, a unique character is determined according to the pressure duration and the pressure type of a finger gesture, resulting in at least four possible outcomes "long-light-touch", "short-light-touch", "short-tap", and "long-tap". These four outcomes may be represented by different characters by the computing device. It is very difficult for a hacker to tell what finger gestures the user applies to the touchpad even if the hacker is able to see the user entering the sequence of finger gestures.

There may or may not be any visible signs on the touchpad when dividing the touchpad into multiple regions. For example, the touchpad may be the touchscreen of a mobile phone and it may have some lines separating the touchscreen into multiple regions as well as other visual cue indicating different characters corresponding to different regions of the touchscreen to guide the user to apply the finger gestures when providing authentication information.

There may be many manners of determining that the user needs to enter the verification code, for example, when the user clicks an input box of the verification code or when an input cursor is in an input box of the verification code, it may be determined that the user needs to enter the verification code.

If in operation 102, the prompt information is already generated, so that the user may perform an operation on the touchpad according to the prompt information, that is, the operation "obtaining a finger gesture of the user on a touchpad" may be specifically: obtaining the finger gesture of the user that is performed on the touchpad according to the prompt information, for example, a "tap" or a "light touch".

104: Generate a corresponding character string according to the sequence of finger gestures.

A rule for generating the character string may be preset. Using a force touch as an example, any one of the following manners may be used:

(1) A first manner is:
generating a binary character "1" when determining that the finger gesture is a light touch;
generating a binary character "0" when determining that the finger gesture is a tap; and
converting the sequence of finger gestures into an ordered list of binary characters according to their respective pressure types.

(2) A second manner is:
generating a binary character "0" when determining that the finger gesture is a light touch;
generating a binary character "1" when determining that the finger gesture is a tap; and
converting the sequence of finger gestures into an ordered list of binary characters according to their respective pressure types.

(3) A third manner is:
generating a binary character "0" when determining that the finger gesture is a light press;
generating a binary character "1" when determining that the finger gesture is a heavy press; and
converting the sequence of finger gestures into an ordered list of binary characters according to their respective pressure types.

In this embodiment of the present disclosure, a pressure threshold may be preset. When pressure exerted by the finger gesture is greater than the pressure threshold, it is determined that the finger gesture is a heavy press. When pressure exerted by the finger gesture is less than or equal to the pressure threshold, it is determined that the finger gesture is a light press.

(4) A fourth manner is:
generating a binary character "1" when determining that the finger gesture is a light press;
generating a binary character "0" when determining that the finger gesture is a heavy press; and
converting the sequence of finger gestures into an ordered list of binary characters according to their respective pressure types.

In this embodiment of the present disclosure, a pressure threshold may be preset. When pressure exerted by the finger gesture is greater than the pressure threshold, it is determined that the finger gesture is a heavy press. When pressure exerted by the finger gesture is less than or equal to the pressure threshold, it is determined that the finger gesture is a light press.

It should be noted that the generated rule corresponds to the prompt information. Certainly, there may also be another manner, and details are not described herein again.

105: Match the character string with the verification code according to a preset rule; and if the character string matches the verification code, perform operation 106; or if the character string does not match the verification code, perform operation 107.

For example, if the verification code is a character string, whether the character string corresponding to the finger gesture is the same as the verification code may be determined, and if the character string corresponding to the finger gesture is the same as the verification code, it is determined that the character string corresponding to the finger gesture matches the verification code, or if the character string corresponding to the finger gesture is different from the verification code, it is determined that the character string corresponding to the finger gesture does not match the verification code.

For another example, if the verification code is a decimal digit combination or a hexadecimal digit combination, the decimal digit combination or the hexadecimal digit combination may be converted into a character string, then whether the character string corresponding to the finger gesture is the same as the converted character string is determined, and if the character string corresponding to the finger gesture is the same as the converted character string, determine that the character string corresponding to the finger gesture matches the verification code; or if the character string corresponding to the finger gesture is different from the converted character string, determine that the character string corresponding to the finger gesture does not match the verification code.

It should be noted that when the decimal digit combination or the hexadecimal digit combination is converted into the character string, each digit in the decimal digit combination or the hexadecimal digit combination may be converted into a binary digit, and then the binary digits are sequenced and combined in order. Alternatively, conversion may be performed by directly using the decimal digit combination or the hexadecimal digit combination as a digit. A specific conversion rule may be set according to a requirement of an actual application and needs to be the same as a conversion rule complied by the user during entering, and details are not described herein again.

106: If the character string matches the verification code, determine that identity authentication succeeds when determining that authentication information is correct.

If it is determined that the authentication information is incorrect, the identity authentication request is rejected.

Whether the authentication information is correct may be determined by comparing the authentication information, such as an account and a password, with prestored authentication information, such as a stored account and a stored password, and details are not described herein again.

107: If the character string does not match the verification code, reject the identity authentication request.

It may be learned from the foregoing that in this embodiment, when an identity authentication request of a user is received, a verification code is generated according to the identity authentication request; a finger gesture of the user on a touchpad is obtained when it is determined that the user needs to enter the verification code; a corresponding character string is generated according to the finger gesture; matching is performed between the character string and the verification code according to a preset rule; and if the character string matches the verification code, it is determined that identity authentication succeeds when it is determined that authentication information carried in the identity authentication request is correct; otherwise, if the character string does not match the verification code, the identity authentication request is rejected, thereby achieving an objective of performing identity authentication on the user. According to this embodiment of the present disclosure, during obtaining the verification code entered by the user, the verification code is obtained by monitoring a touchpad instead of by using a keyboard. Therefore, compared with the existing technology that the verification code can be entered by using only the keyboard, this embodiment of the present disclosure provides one more selection for the user to enter the verification code, thereby greatly facilitating operations of the user, so as to beneficial to improve operation flexibility, interesting, and interaction.

An embodiment of the present disclosure provides an identity authentication method. According to the method described in the embodiment shown in FIG. 1, a detailed description is further made below with an example.

In this embodiment, an example in which the verification code is a character string, "0" indicates a light touch, and "1" indicates a tap is used for description.

Figure 2A:
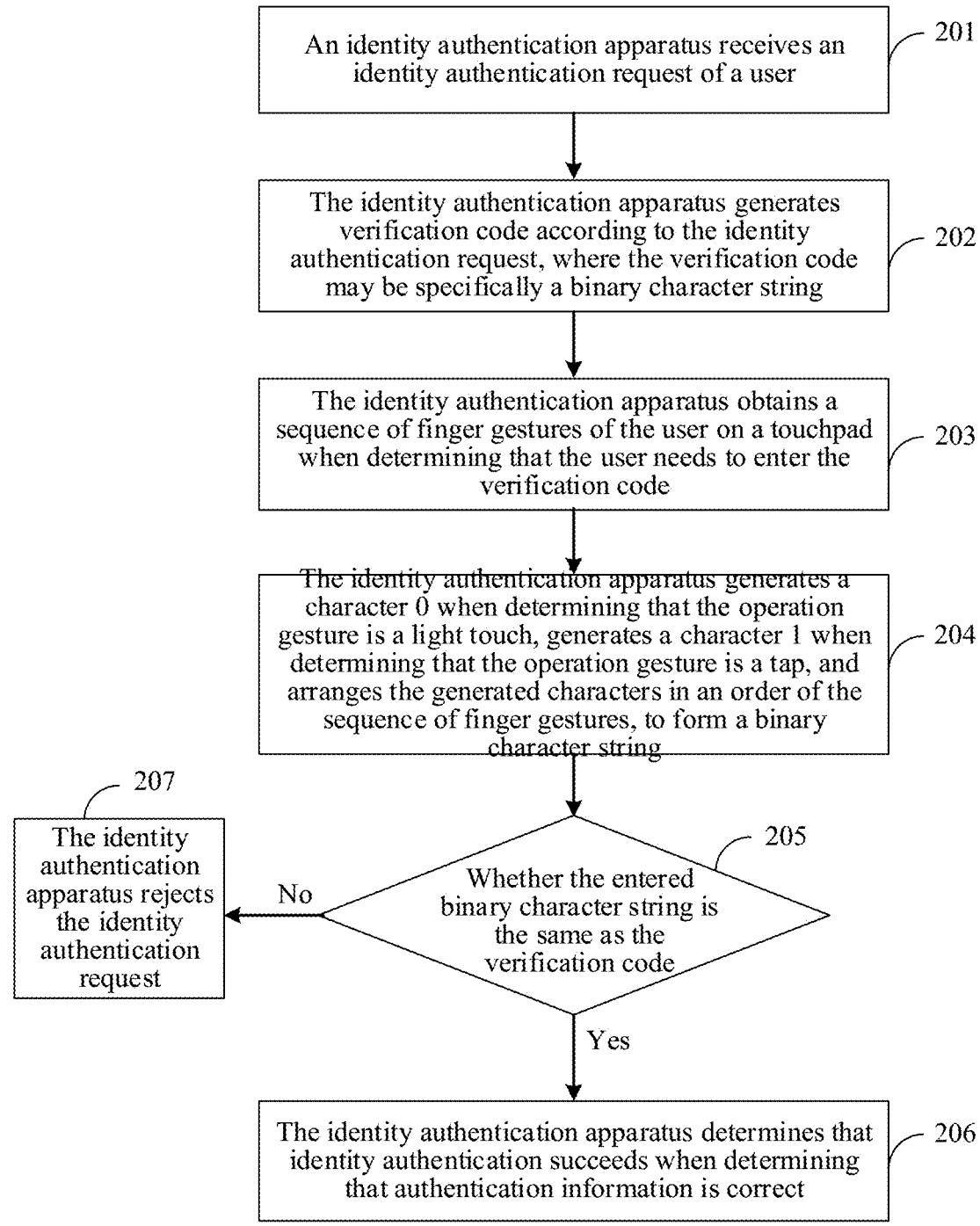
FIG. 2a is another flowchart of an identity authentication method according to some embodiments of the present disclosure.

As shown in FIG. 2a, the identity authentication method includes the following specific procedure.

201: An identity authentication apparatus receives an identity authentication request of a user.

The identity authentication request may carry authentication information, for example, an account and a password of the user. The account may include an email address, a number of instant messaging, a name of the user, or a number of the user.

202: The identity authentication apparatus generates a verification code according to the identity authentication request, where the verification code may be specifically a character string.

For example, when the identity authentication request of the user is received, for example, when the user opens a login interface, or the user enters the authentication information, or the user clicks a trigger key for generating the verification code on the login interface, the verification code is generated according to a preset policy. The preset policy may be determined according to a requirement of an actual application. For example, the verification code may be randomly generated, or may be generated according to a rule.

Figure 2B:
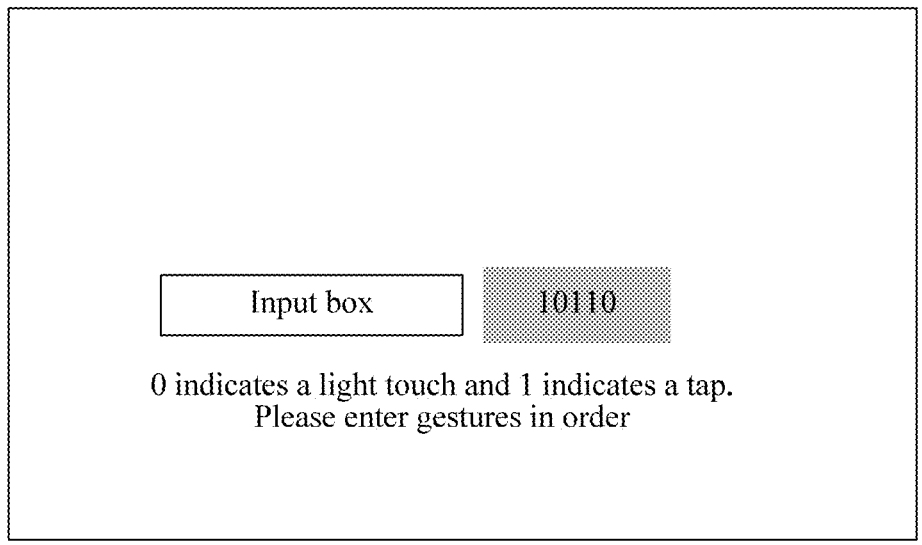
FIG. 2b is a schematic diagram of a verification code input interface in an identity authentication method according to some embodiments of the present disclosure.

In this embodiment of the present disclosure, for ease of operations of the user, during verification code generation, prompt information may further be generated, so as to indicate a correspondence between a finger gesture and a binary character. For example, as shown in FIG. 2b, when a verification code "10110" is displayed, the user may be informed that: "0 indicates a light touch and 1 indicates a tap. Please enter gestures in order", and the like.

203: The identity authentication apparatus obtains a finger gesture of the user on a touchpad when determining that the user needs to enter the verification code.

For example, the user may perform a finger gesture such as a "tap" or a "light touch" on the touchpad according to the prompt information, and then performs confirmation after the finger gesture is entered, so that the identity authentication apparatus may receive the finger gesture.

There may be many manners of determining that the user needs to enter the verification code, for example, when the user clicks an input box of the verification code or when an input cursor is in an input box of the verification code, it may be determined that the user needs to enter the verification code.

204: The identity authentication apparatus generates a binary character "0" when determining that the finger gesture is a light touch, generates a binary character "1" when determining that the finger gesture is a tap, and arranges the generated characters in an order of the finger gestures, to form a character string.

205: The identity authentication apparatus determines whether the character string corresponding to the finger gesture is the same as the verification code, and if the character string corresponding to the finger gesture is the same as the verification code, determines that the character string corresponding to the finger gesture matches the verification code, and performs operation 206; or if the character string corresponding to the finger gesture is different from the verification code, determines that the character string corresponding to the finger gesture does not match the verification code, and performs operation 207.

206: The identity authentication apparatus determines that identity authentication succeeds when determining that authentication information is correct.

If it is determined that the authentication information is incorrect, the identity authentication request is rejected (that is, operation 207 is performed).

Whether the authentication information is correct may be determined by comparing the authentication information, such as an account and a password, with prestored authentication information, such as a stored account and a stored password, and details are not described herein again.

207: The identity authentication apparatus rejects the identity authentication request.

It should be noted that the user is not only allowed to enter the verification code by using the touchpad, but is also allowed to enter the verification code in another manner, such as by using a keyboard, that is, the user may select a manner of entering the verification code, and details are not described herein.

It may be learned from the foregoing that in this embodiment, when an identity authentication request of a user is received, a character string is generated as a verification code according to the identity authentication request; a finger gesture of the user on a touchpad is obtained when it is determined that the user needs to enter the verification code, for example, a tap or a light touch; a corresponding character string is generated according to the finger gesture; comparison is performed between the character string and the verification code; and if the character string is the same as the verification code, it is determined that identity authentication succeeds when it is determined that authentication information carried in the identity authentication request is correct; otherwise, if the character string is different from the verification code, the identity authentication request is rejected, thereby achieving an objective of performing identity authentication on the user. According to this embodiment of the present disclosure, during obtaining the verification code entered by the user, the verification code is obtained by monitoring a touchpad instead of by using a keyboard. Therefore, compared with the existing technology that the verification code can be entered by using only the keyboard, this embodiment of the present disclosure provides one more selection for the user to enter the verification code, thereby greatly facilitating operations of the user, so as to beneficial to improve operation flexibility, interesting, and interaction.

An embodiment of the present disclosure provides an identity authentication method. According to the method described in the embodiment shown in FIG. 1, a detailed description is further made below with an example.

In this embodiment, an example in which the verification code is a decimal character string, "0" indicates a light touch, and "1" indicates a tap is used for description.

Figure 3A:
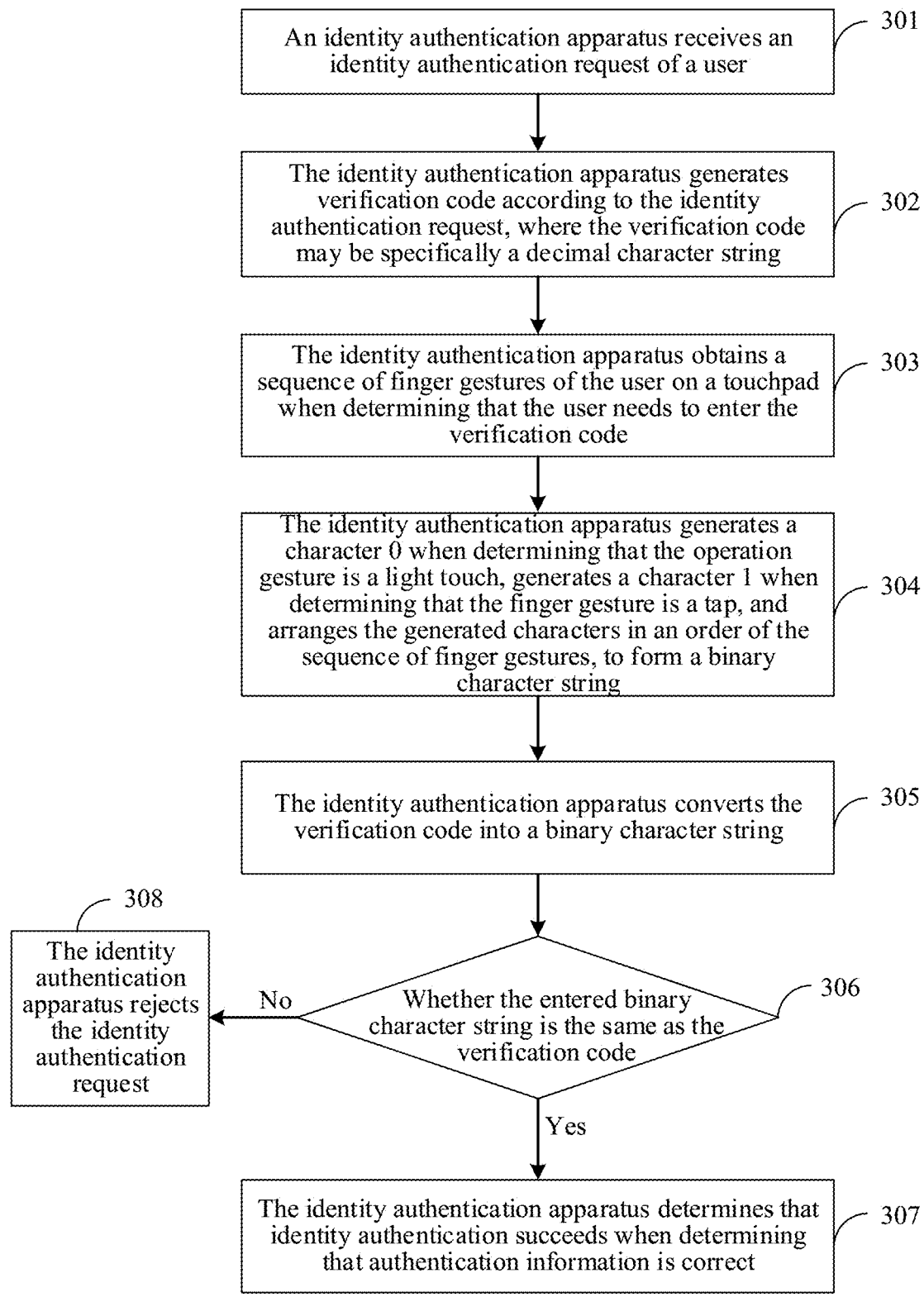
FIG. 3a is still another flowchart of an identity authentication method according to some embodiments of the present disclosure.

As shown in FIG. 3*a*, the identity authentication method may include the following specific procedure.

301: An identity authentication apparatus receives an identity authentication request of a user.

The identity authentication request may carry authentication information, for example, an account and a password of the user. The account may include an email address, a number of instant messaging, a name of the user, or a number of the user.

302: The identity authentication apparatus generates a verification code according to the identity authentication request, where the verification code may be specifically a decimal character string.

For example, when the identity authentication request of the user is received, for example, when the user opens a login interface, or the user enters the authentication information, or the user clicks a trigger key for generating the verification code on the login interface, the verification code is generated according to a preset policy. The preset policy may be determined according to a requirement of an actual application. For example, the verification code may be randomly generated, or may be generated according to a rule.

Figure 3B:
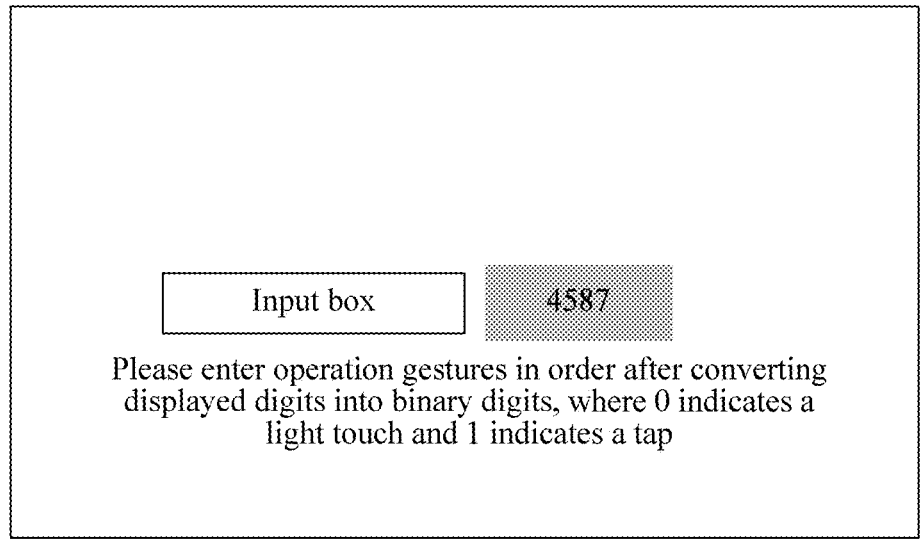
FIG. 3b is another schematic diagram of a verification code input interface in an identity authentication method according to some embodiments of the present disclosure.

In this embodiment of the present disclosure, for ease of operations of the user, during verification code generation, prompt information may further be generated, so as to indicate a correspondence between a finger gesture and a binary character. For example, as shown in FIG. 3*b*, when a verification code "4587" is displayed, the user may be informed that: "Please enter finger gestures in order after converting displayed digits into binary digits, where 0 indicates a light touch and 1 indicates a tap", and the like.

In this embodiment of the present disclosure, the user may alternatively be required to enter a binary digit of a part of digits in the decimal character string. For example, "8" in the verification code "4587" may be highlighted, for example, highlighted with a colour, such as red, that is different from a colour of other digits, and then the user is required to enter a binary digit corresponding to "8" on a touchpad, where 0 indicates a light touch and 1 indicates a tap, and the like.

303: The identity authentication apparatus obtains a finger gesture of the user on a touchpad when determining that the user needs to enter the verification code.

For example, the user may perform a finger gesture such as a "tap" or a "light touch" on the touchpad according to the prompt information, and then performs confirmation after the finger gesture is entered, so that the identity authentication apparatus may receive the finger gesture.

There may be many manners of determining that the user needs to enter the verification code, for example, when the user clicks an input box of the verification code or when an input cursor is in an input box of the verification code, it may be determined that the user needs to enter the verification code.

304: The identity authentication apparatus generates a binary character "0" when determining that the finger gesture is a light touch, generates a binary character "1" when determining that the finger gesture is a tap, and arranges the generated characters in an order of the finger gestures, to form a character string.

305: The identity authentication apparatus converts the verification code, that is, the decimal digit combination into a character string.

For example, each digit in the decimal digit combination may be converted into a binary digit, and then the binary digits are sequenced and combined in order.

Using "4587" as an example, "4" may be converted into "100", "5" may be converted into "101", "8" may be converted into "1000", and "7" may be converted into "111". Then the digits are combined in order, that is, "1001011000111".

Certainly, the decimal digit may be directly converted into a binary digit instead of converting each digit into a binary digit. For example, the digit "4587" may be converted into a binary digit "1000111101011", and the like. Specifically, that which manner needs to be used may be set according to a requirement of an actual application, and the manner needs to be the same as a conversion rule complied by the user during entering.

306: The identity authentication apparatus determines whether the character string corresponding to the finger gesture is the same as the converted character string (that is, the verification code), and if the character string corresponding to the finger gesture is the same as the verification code, determines that the character string corresponding to the finger gesture matches the verification code, and performs operation 307; or if the character string corresponding to the finger gesture is different from the verification code, determines that the character string corresponding to the finger gesture does not match the verification code, and performs operation 308.

307: The identity authentication apparatus determines that identity authentication succeeds when determining that authentication information is correct.

If it is determined that the authentication information is incorrect, the identity authentication request is rejected (that is, operation 307 is performed).

Whether the authentication information is correct may be determined by comparing the authentication information, such as an account and a password, with prestored authentication information, such as a stored account and a stored password, and details are not described herein again.

308: The identity authentication apparatus rejects the identity authentication request.

It should be noted that, in the foregoing description, an example in which the verification code is a decimal character string is merely used for description. It should be understood that the verification code may alternatively be represented in another manner, for example, a hexadecimal character string or a colour combination, and an implementation manner described above, and details are not described herein again.

It may be learned from the foregoing that in this embodiment, when an identity authentication request of a user is received, a decimal character string is generated as a verification code according to the identity authentication request; a finger gesture of the user on a touchpad is obtained when it is determined that the user needs to enter the verification code, for example, a tap or a light touch; a corresponding character string is generated according to the finger gesture, and the verification code is converted into a character string; comparison is performed between the character string and the character string converted from the verification code; and if the character string is the same as the character string converted from the verification code, it is determined that identity authentication succeeds when it is determined that authentication information carried in the identity authentication request is correct; otherwise, if the character string is different from the character string converted from the verification code, the identity authentication request is rejected, thereby achieving an objective of performing identity authentication on the user. According to this embodiment of the present disclosure, during obtaining the verification code entered by the user, the verification code is obtained by monitoring a touchpad instead of by using a keyboard. Therefore, compared with the existing technology that the verification code can be entered by using only the keyboard, this embodiment of the present disclosure provides one more selection for the user to enter the verification code, thereby greatly facilitating operations of the user, so as to beneficial to improve operation flexibility, interesting, and interaction.

Figure 4:
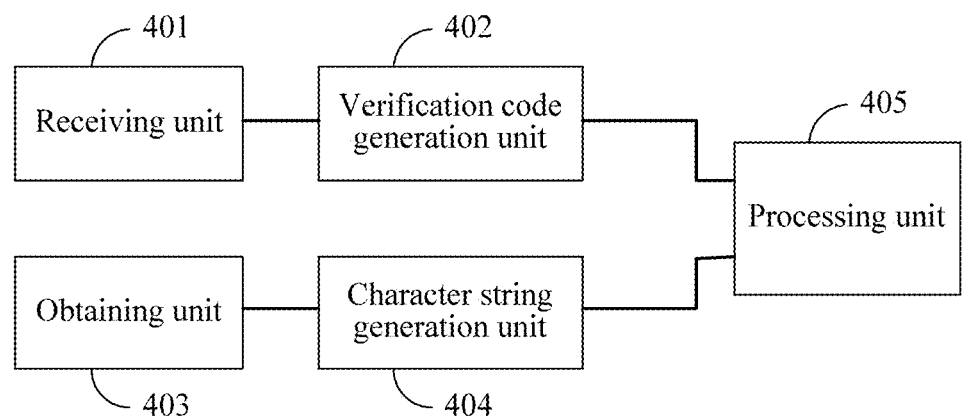
FIG. 4 is a schematic structural diagram of an identity authentication apparatus according to some embodiments of the present disclosure.

An embodiment of the present disclosure further provides an identity authentication apparatus. As shown in FIG. 4, the identity authentication apparatus includes a receiving unit 401, a verification code generation unit 402, an obtaining unit 403, a character string generation unit 404, and a processing unit 405.

The receiving unit 401 is configured to receive an identity authentication request of a user.

The identity authentication request may carry authentication information, for example, an account and a password of the user. The account may include an email address, a number of instant messaging, a name of the user, or a number of the user.

the verification code generation unit 402 is configured to generate a verification code according to the identity authentication request.

For example, when the identity authentication request of the user is received, for example, when the user opens a login interface, or the user enters the authentication information, or the user clicks a trigger key for generating the verification code on the login interface, the verification code is generated according to a preset policy.

The preset policy may be determined according to a requirement of an actual application. For example, the verification code may be randomly generated, or may be generated according to a rule. the verification code may be a character string, or may be digits in another base, such as decimal or hexadecimal digits; or may even be an image combination or a colour combination, such as a combination of a male photo and a female photo, a combination of black and white, or a combination of blue and red, and details are not described herein.

In this embodiment of the present disclosure, for ease of operations of the user, during verification code generation, prompt information may further be generated, so as to indicate a correspondence between a finger gesture and a binary character. the verification code generation unit 402 may further be configured to generate prompt information. The prompt information is used to indicate a correspondence between a finger gesture and a binary character.

For example, if "0" indicates a light touch and "1" indicates a tap, the user may be informed that: "0 indicates a light touch and 1 indicates a tap. Please enter gestures in order".

For another example, if "1" indicates a light touch and "0" indicates a tap, the user may be informed that: "1 indicates a light touch and 0 indicates a tap. Please enter gestures in order".

For another example, if a male photo indicates a light touch and a female photo indicates a tap, the user may be informed that: "A male photo indicates a light touch and a female photo indicates a tap. Please enter gestures in order".

For another example, if black indicates a light touch and white indicates a tap, the user may be informed that: "Black indicates a light touch and white indicates a tap. Please enter gestures in order".

For another example, entered information may alternatively be distinguished according to different pressing forces. For example, If "0" indicates a light press and "1" indicates a heavy press, the user may be informed that: "0 indicates a light press and 1 indicates a heavy press. Please enter gestures in order".

Alternatively, if "1" indicates a light press and "0" indicates a heavy press, the user may be informed that: "1 indicates a light press and 0 indicates a heavy press. Please enter gestures in order".

The rest can be deduced by analogy, and details are not described herein again.

It should be noted that, besides a "light touch", a "tap", a "light press", and a "heavy press", there may be another finger gesture, such as "drawing a circle". A correspondence between the finger gesture and a binary character may be set according to a requirement of an actual application, and details are not described herein again.

The obtaining unit 403 is configured to obtain a finger gesture of the user on a touchpad when determining that the user needs to enter the verification code;

For example, the obtaining unit 403 may be specifically configured to obtain a finger gesture of the user on a touchpad when determining that the user needs to enter the verification code.

There may be many manners of determining that the user needs to enter the verification code, for example, when the user clicks an input box of the verification code or when an input cursor is in an input box of the verification code, it may be determined that the user needs to enter the verification code.

The character string generation unit 404 is configured to generate a corresponding character string according to the sequence of finger gestures.

A rule for generating the character string may be preset. For example, in this embodiment of the present disclosure, The character string generation unit 404 may be specifically configured to: generate a binary character "1" when determining that the finger gesture is a light touch; generate a binary character "0" when determining that the finger gesture is a tap; and arrange the generated characters in an order of the finger gestures, to form a character string.

Alternatively, the character string generation unit 404 may be specifically configured to: generate a binary character "0" when determining that the finger gesture is a light touch; generate a binary character "1" when determining that the finger gesture is a tap; and arrange the generated characters in an order of the finger gestures, to form a character string.

Alternatively, the character string generation unit 404 may be specifically configured to: generate a binary character "0" when determining that the finger gesture is a light press; generate a binary character "1" when determining that the finger gesture is a heavy press; and arrange the generated characters in an order of the finger gestures, to form a character string.

Alternatively, the character string generation unit 404 may be specifically configured to: generate a binary character "1" when determining that the finger gesture is a light press; generate a binary character "0" when determining that the finger gesture is a heavy press; and arrange the generated characters in an order of the finger gestures, to form a character string.

It should be noted that the generated rule corresponds to the prompt information. Certainly, there may also be another manner, and details are not described herein again.

The processing unit 405 is configured to match the character string with the verification code according to a preset rule, and if the character string matches the verification code, determine that identity authentication succeeds when determining that the authentication information is correct; or if the character string does not match the verification code, reject the identity authentication request.

For example, if the verification code is a character string, the processing unit 405 may be specifically configured to determine whether the character string corresponding to the finger gesture is the same as the verification code, and if the character string corresponding to the finger gesture is the same as the verification code, determine that the character string corresponding to the finger gesture matches the verification code, or if the character string corresponding to the finger gesture is different from the verification code, determine that the character string corresponding to the finger gesture does not match the verification code.

For another example, if the verification code is a decimal digit combination or a hexadecimal digit combination, the processing unit 405 may be specifically configured to: convert the decimal digit combination or the hexadecimal digit combination into a character string, determine whether the character string corresponding to the finger gesture is the same as the converted character string, and if the character string corresponding to the finger gesture is the same as the converted character string, determine that the character string corresponding to the finger gesture matches the verification code; or if the character string corresponding to the finger gesture is different from the converted character string, determine that the character string corresponding to the finger gesture does not match the verification code.

It should be noted that when the decimal digit combination or the hexadecimal digit combination is converted into the character string, each digit in the decimal digit combination or the hexadecimal digit combination may be converted into a binary digit, and then the binary digits are sequenced and combined in order. Alternatively, conversion may be performed by directly using the decimal digit combination or the hexadecimal digit combination as a digit. A specific conversion rule may be set according to a requirement of an actual application and needs to be the same as a conversion rule complied by the user during entering, and details are not described herein again.

The processing unit 405 is further configured to: when determining that the character string matches the verification code, reject the identity authentication request if it is determined that the authentication information is incorrect.

During specific implementation, each of the foregoing units may be implemented as an independent entity; or may be randomly combined, so as to be implemented as a same entity or several entities. For specific implementations of the foregoing units, refer to the foregoing method embodiments, and details are not described herein again.

The identity authentication apparatus may be specifically integrated into a terminal, a server, or another device requires identity authentication.

It may be learned from the foregoing that in this embodiment of the present disclosure, when the identity authentication apparatus receives an identity authentication request of a user, the verification code generation unit 402 generates a verification code according to the identity authentication request; the obtaining unit 403 obtains a finger gesture of the user on a touchpad when determining that the user needs to enter the verification code; the character string generation unit 404 generates a corresponding character string according to the sequence of finger gestures; and the processing unit 405 matches the character string with the verification code according to a preset rule, and if the character string matches the verification code, determines that identity authentication succeeds when determining that authentication information carried in the identity authentication request is correct; otherwise, if the character string does not match the verification code, rejects the identity authentication request, thereby achieving an objective of performing identity authentication on the user. According to this embodiment of the present disclosure, during obtaining the verification code entered by the user, the verification code is obtained by monitoring a touchpad instead of by using a keyboard. Therefore, compared with the existing technology that the verification code can be entered by using only the keyboard, this embodiment of the present disclosure provides one more selection for the user to enter the verification code, thereby greatly facilitating operations of the user, so as to beneficial to improve operation flexibility, interesting, and interaction.

In addition, an embodiment of the present disclosure further provides an identity authentication device, which may include any identity authentication apparatus provided in the embodiment of the present disclosure. For details, refer to the embodiment shown in FIG. 4.

For example, an identity authentication apparatus included in the identity authentication device is configured to: receive an identity authentication request of a user, the identity authentication request carrying authentication information; generate a verification code according to the identity authentication request; obtain a finger gesture of the user on a touchpad when determining that the user needs to enter the verification code; generate a corresponding character string according to the sequence of finger gestures; match the character string with the verification code according to a preset rule; and if the character string matches the verification code, determine that identity authentication succeeds when determining that the authentication information is correct; or if the character string does not match the verification code, reject the identity authentication request.

For example, a binary character "1" is generated when it is determined that the finger gesture is a light touch, a binary character "0" is generated when it is determined that the finger gesture is a tap, and then the generated characters are arranged in an order of the finger gestures, to form a character string.

Alternatively, for example, a binary character "0" is generated when it is determined that the finger gesture is a light touch, a binary character "1" is generated when it is determined that the finger gesture is a tap, and then the generated characters are arranged in an order of the finger gestures, to form a character string.

The identity authentication device may be specifically a terminal, a server, or another device requires identity authentication. For specific implementations of the foregoing operations, refer to the foregoing embodiment, and details are not described herein again.

The identity authentication device may include any identity authentication apparatus provided in the embodiment of the present disclosure, so that beneficial effects that can be implemented by any identity authentication apparatus provided in the embodiment of the present disclosure may be achieved. For details, refer to the foregoing embodiment, and details are not described herein again.

Figure 5:
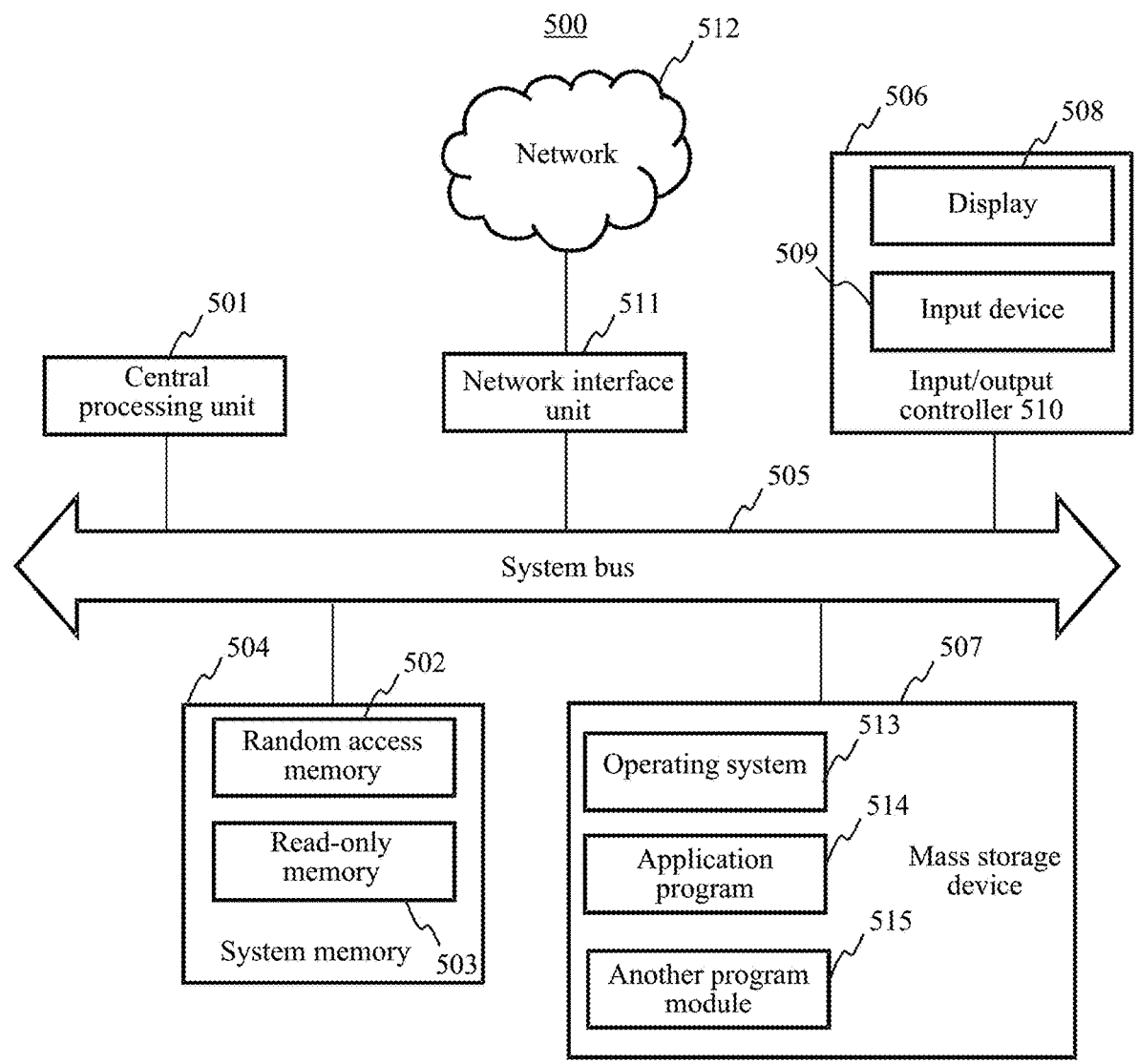
FIG. 5 is a schematic structural diagram of a terminal according to some embodiments of the present disclosure.

Referring to FIG. 5, FIG. 5 is a schematic structural diagram of a terminal according to some embodiments of the present disclosure. The terminal 500 may be a conventional desktop computer, a laptop computer, an intelligent mobile terminal, or a dedicated identity authentication device. The terminal 500 includes a central processing unit (CPU) 501, a system memory 504 including a random access memory (RAM) 502 and a read-only memory (ROM) 503, and a system bus 505 connecting the system memory 504 and the central processing unit 501. The terminal 500 further includes a basic input/output system (I/O system) 506 configured to transmit information between components in the terminal, and a mass storage device 507 configured to store an operating system 513, an application program 514, and another program module 515.

The basic I/O system 506 includes a display 508 configured to display information, and an input device 509, such as a touchpad, a mouse, or a keyboard, configured for a user to input information. The display 508 and the input device 509 are connected to the CPU 501 by being connected to an input/output controller 510 of the system bus 505. The basic I/O system 506 may further include the input/output controller 510, so as to receive and process input of multiple other devices, such as the touchpad, the touchscreen, the keyboard, the mouse, or an electronic stylus. Similarly, the input/output controller 510 further provides output to a display screen, a printing machine, or an output device of another type.

The mass storage device 507 is connected to the CPU 501 by being connected to a mass storage controller (not shown) of the system bus 505. The mass storage device 507 and an associated terminal readable medium of the mass storage device 507 provide non-volatile storage to the terminal 500. That is, the mass storage device 507 may include a non-transitory computer readable medium (not shown), such as a hard disk or a CD-ROM drive.

Without loss of generality, the non-transitory computer readable medium may include a computer storage medium and a communication medium. The computer storage medium includes volatile, non-volatile, removable, and non-removable media that are implemented by using any method or technology used for storing information, such as a computer readable instruction, a data structure, a program module, or other data. The computer storage medium includes solid storage, such as a RAM, a ROM, an EPROM, an EEPROM, or a flash memory; optical storage, such as a CD-ROM or a DVD, and a magnetic storage device, such as a cassette, a tape, or magnetic storage. Certainly, a person skilled in the art may know that the computer storage medium is not limited to the foregoing.

According to the embodiments of the present disclosure, the terminal 500 may further be connected, by using a network, such as Internet, to a remote computer on the network. That is, the terminal 500 may be connected to a network 512 by being connected to a network interface unit 511 on the system bus 505, or may be connected to a network of another type or a remote computer system (not shown) by using the network interface unit 511. According to the embodiments of the present disclosure, the terminal 500 may be connected to the network 512 by using the network interface unit 511 in a wired manner or a wireless manner.

A person of ordinary skill in the art may understand that all or some of the operations of the methods in the embodiments may be implemented by a program instructing relevant hardware. The program may be stored in a non-transitory computer readable storage medium. The storage medium may include: a read-only memory (ROM), a random access memory (RAM), a magnetic disk, an optical disc, or the like.

An identity authentication method and apparatus provided in the embodiments of the present disclosure is described above in detail. In this specification, specific examples are used to describe the principle and implementation manners of the present disclosure, and the description of the embodiments is only intended to help understand the method and core idea of the present disclosure. Meanwhile, a person of ordinary skill in the art may, based on the idea of the present disclosure, make modifications with respect to the specific implementation manners and the application scope. Therefore, the content of this specification shall not be construed as a limitation to the present disclosure.

What is claimed is:

1. An identity authentication method performed at a computing device having one or more processors, memory storing one or more programs to be executed by the one or more processors and a touchpad, the method comprising:
   receiving an identity authentication request from a user, the identity authentication request carrying authentication information;
   generating a verification code according to the authentication information;
   obtaining a sequence of finger gestures on the touchpad from the user, wherein each finger gesture has an associated pressure type on the touchpad;
   generating a corresponding character string according to the sequence of finger gestures;
   comparing the character string with the verification code of a user account associated with an application program;
   in accordance with a determination that the character string matches the verification code, granting the user access to the user account associated with the application program; and
   in accordance with a determination that the character string does not match the verification code, denying the user access to the user account associated with the application program.

2. The method according to claim 1, wherein the operation of generating the verification code according to the authentication information further comprises:
   generating prompt information, wherein the prompt information is used to indicate a correspondence between a finger gesture and a binary character;
   detecting a finger gesture of the user on the touchpad;
   generating a character for the finger gesture when the finger gesture satisfies the prompt information.

3. The method according to claim 1, wherein the pressure type of a finger gesture is one selected the group consisting of a light touch and a tap, and the operation of generating a corresponding character string according to the sequence of finger gestures comprises:
   generating a binary character "1" when determining that a finger gesture is a light touch;
   generating a binary character "0" when determining that a finger gesture is a tap; and
   converting the sequence of finger gestures into an ordered list of binary characters according to their respective pressure types.

4. The method according to claim 1, wherein the touchpad is divided into multiple regions, each region being associated with a unique character, and the pressure type of a finger gesture is one selected the group consisting of a light touch and a tap, and the operation of obtaining a sequence of finger gestures on the touchpad from the user further comprises:
   determining a region corresponding to a pressure location for each finger gesture;
   identifying a unique character associated with the region according to the pressure location of the finger gesture and a binary character according to the pressure type of the finger gesture; and
   adding the unique character corresponding to the pressure location and the binary character corresponding to the pressure type to the character string.

5. The method according to claim 1, wherein the operation of obtaining a sequence of finger gestures on the touchpad from the user further comprises:
   determining a pressure duration for each finger gesture;
   identifying a unique character according to the pressure duration and the pressure type of the finger gesture; and
   adding the unique character to the character string.

6. A computing device comprising one or more processors, a touchpad, memory, and one or more programs stored in the memory that, when executed by the one or more processors, cause the computing device to perform a plurality of operations including:
   receiving an identity authentication request from a user, the identity authentication request carrying authentication information;
   generating a verification code according to the authentication information;
   obtaining a sequence of finger gestures on the touchpad from the user, wherein each finger gesture has an associated pressure type on the touchpad;
   generating a corresponding character string according to the sequence of finger gestures;
   comparing the character string with the verification code of a user account associated with an application program;
   in accordance with a determination that the character string matches the verification code, granting the user access to the user account associated with the application program; and
   in accordance with a determination that the character string does not match the verification code, denying the user access to the user account associated with the application program.

7. The computing device according to claim 6, wherein the operation of generating the verification code according to the authentication information further comprises:
   generating prompt information, wherein the prompt information is used to indicate a correspondence between a finger gesture and a binary character;
   detecting a finger gesture of the user on the touchpad;
   generating a character for the finger gesture when the finger gesture satisfies the prompt information.

8. The computing device according to claim 6, wherein the pressure type of a finger gesture is one selected the group consisting of a light touch and a tap, and the operation of generating a corresponding character string according to the sequence of finger gestures comprises:
   generating a binary character "1" when determining that a finger gesture is a light touch;
   generating a binary character "0" when determining that a finger gesture is a tap; and
   converting the sequence of finger gestures into an ordered list of binary characters according to their respective pressure types.

9. The computing device according to claim 6, wherein the touchpad is divided into multiple regions, each region being associated with a unique character, and the pressure type of a finger gesture is one selected the group consisting of a light touch and a tap, and the operation of obtaining a sequence of finger gestures on the touchpad from the user further comprises:

determining a region corresponding to a pressure location for each finger gesture;

identifying a unique character associated with the region according to the pressure location of the finger gesture and a binary character according to the pressure type of the finger gesture; and adding the unique character corresponding to the pressure location and the binary character corresponding to the pressure type to the character string.

10. The computing device according to claim 6, wherein the operation of obtaining a sequence of finger gestures on the touchpad from the user further comprises:

determining a pressure duration for each finger gesture;

identifying a unique character according to the pressure duration and the pressure type of the finger gesture; and adding the unique character to the character string.

11. A non-transitory computer readable storage medium storing one or more programs, wherein the one or more programs, when executed by one or more processors of a computing device having a touchpad, cause the computing device to perform a plurality of operations including:

receiving an identity authentication request from a user, the identity authentication request carrying authentication information;

generating a verification code according to the authentication information;

obtaining a sequence of finger gestures on the touchpad from the user, wherein each finger gesture has an associated pressure type on the touchpad;

generating a corresponding character string according to the sequence of finger gestures;

comparing the character string with the verification code of a user account associated with an application program;

in accordance with a determination that the character string matches the verification code, granting the user access to the user account associated with the application program; and in accordance with a determination that the character string does not match the verification code, denying the user access to the user account associated with the application program.

12. The non-transitory computer readable storage medium according to claim 11, wherein the operation of generating the verification code according to the authentication information further comprises:

generating prompt information, wherein the prompt information is used to indicate a correspondence between a finger gesture and a binary character;

detecting a finger gesture of the user on the touchpad;

generating a character for the finger gesture when the finger gesture satisfies the prompt information.

13. The non-transitory computer readable storage medium according to claim 11, wherein the pressure type of a finger gesture is one selected the group consisting of a light touch and a tap, and the operation of generating a corresponding character string according to the sequence of finger gestures comprises:

generating a binary character "1" when determining that a finger gesture is a light touch;

generating a binary character "0" when determining that a finger gesture is a tap; and converting the sequence of finger gestures into an ordered list of binary characters according to their respective pressure types.

14. The non-transitory computer readable storage medium according to claim 11, wherein the touchpad is divided into multiple regions, each region being associated with a unique character, and the pressure type of a finger gesture is one selected the group consisting of a light touch and a tap, and the operation of obtaining a sequence of finger gestures on the touchpad from the user further comprises:

determining a region corresponding to a pressure location for each finger gesture;

identifying a unique character associated with the region according to the pressure location of the finger gesture and a binary character according to the pressure type of the finger gesture; and adding the unique character corresponding to the pressure location and the binary character corresponding to the pressure type to the character string.

15. The non-transitory computer readable storage medium according to claim 11, wherein the operation of obtaining a sequence of finger gestures on the touchpad from the user further comprises:

determining a pressure duration for each finger gesture;

identifying a unique character according to the pressure duration and the pressure type of the finger gesture; and adding the unique character to the character string.

\* \* \* \* \*